(12) United States Patent
Cross et al.

(10) Patent No.: US 10,410,531 B2
(45) Date of Patent: Sep. 10, 2019

(54) SYSTEMS AND METHODS FOR GENERATING IMPROVED ENVIRONMENTAL DISPLAYS FOR VEHICLES

(71) Applicant: SIERRA NEVADA CORPORATION, Sparks, NV (US)

(72) Inventors: Jack Philip Cross, Reno, NV (US); William Edward Brandstetter, III, Sparks, NV (US); Igor Valigura, Sparks, NV (US); Justin Michael Bode, Reno, NV (US); Damien Bruno Jourdan, San Jose, CA (US); David McMartin Howard, Sparks, NV (US); Rodney Lee Pickens, Sparks, NV (US); Timothy L. Sweet, Sparks, NV (US); Joshua D. Gleason, Reno, NV (US); Joseph H. Hansen, Jr., Kaysville, UT (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 0 days.

(21) Appl. No.: 15/520,780

(22) PCT Filed: Nov. 5, 2015

(86) PCT No.: PCT/US2015/059209
§ 371 (c)(1),
(2) Date: Apr. 20, 2017

(87) PCT Pub. No.: WO2016/073698
PCT Pub. Date: May 12, 2016

(65) Prior Publication Data
US 2017/0345321 A1 Nov. 30, 2017

Related U.S. Application Data

(60) Provisional application No. 62/075,724, filed on Nov. 5, 2014.

(51) Int. Cl.
*G08G 5/04* (2006.01)
*G01C 23/00* (2006.01)
(Continued)

(52) U.S. Cl.
CPC ............. *G08G 5/045* (2013.01); *B64D 45/08* (2013.01); *B64D 47/08* (2013.01); *G01C 23/005* (2013.01);
(Continued)

(58) Field of Classification Search
CPC ..... G01C 23/005; G01S 13/953; G06T 17/00; G08G 5/0021; G08G 5/045
See application file for complete search history.

(56) References Cited

U.S. PATENT DOCUMENTS 6,401,038 B2 6/2002 Gia
6,714,861 B2 * 3/2004 Okude .................. G01C 21/32
701/458
(Continued)

FOREIGN PATENT DOCUMENTS

JP H095050 1/1997
WO WO2014159330 10/2014

OTHER PUBLICATIONS

International Search Report and Written Opinion on related PCT application (PCT/US2015/059209) from International Searching Authority (USPTO) dated Jan. 28, 2016.
(Continued)

*Primary Examiner* — Tyler J Lee
(74) *Attorney, Agent, or Firm* — Klein, O'Neill & Singh, LLP

(57) ABSTRACT

An imaging system for a moving vehicle aggregates pre-existing data with sensor data to provide an image of the surrounding environment in real-time. The pre-existing data are combined with data from one or more 3-D sensors, and
(Continued)

2-D information from a camera, to create a scene model that is rendered for display. The system accepts data from a 3-D sensor, transforms the data into a 3-D data structure, fuses the pre-existing scene data with the 3-D data structure and 2-D image data from a 2-D sensor to create a combined scene model, and renders the combined scene model for display. The system may also weight aspects of data from first and second sensors to select at least one aspect from the first sensor and another aspect from the second sensor; wherein fusing the pre-existing scene data with the sensor data uses the selected aspect from the first sensor and the selected aspect from the second sensor.

12 Claims, 10 Drawing Sheets

(51) Int. Cl.
- *G06T 17/00* (2006.01)
- *G01S 13/95* (2006.01)
- *B64D 45/08* (2006.01)
- *B64D 47/08* (2006.01)
- *G08G 5/00* (2006.01)

(52) U.S. Cl.
CPC ............ *G01S 13/953* (2013.01); *G06T 17/00* (2013.01); *G08G 5/0021* (2013.01); *G08G 5/0052* (2013.01); *G08G 5/0086* (2013.01)

(56) References Cited

U.S. PATENT DOCUMENTS

| | | | |
|---|---|---|---|
| 7,106,217 B2 | 9/2006 | Judge et al. | |
| 7,120,540 B2* | 10/2006 | Meunier | G01C 5/005 701/301 |
| 7,123,260 B2* | 10/2006 | Brust | G01C 23/00 345/428 |
| 7,305,396 B2* | 12/2007 | Schmidt | G01C 21/3638 |
| 7,352,292 B2* | 4/2008 | Alter | G01C 23/00 340/945 |
| 7,436,405 B2* | 10/2008 | Losasso Petterson | G06T 15/10 345/423 |
| 7,609,200 B1* | 10/2009 | Woodell | G01S 13/953 342/176 |
| 7,675,461 B1* | 3/2010 | McCusker | G01S 7/20 342/179 |
| 7,688,248 B2* | 3/2010 | Cross | G01S 7/20 342/179 |
| 7,747,364 B2 | 6/2010 | Roy et al. | |
| 7,925,117 B2 | 4/2011 | Hamza et al. | |
| 8,049,644 B1* | 11/2011 | Oehlert | G06T 17/05 340/963 |
| 8,185,301 B1* | 5/2012 | Simon | G01C 23/005 340/945 |
| 8,264,379 B2* | 9/2012 | Whitlow | G01C 23/00 340/945 |
| 8,279,108 B2* | 10/2012 | Nouvel | G01C 5/005 340/945 |
| 8,466,874 B1* | 6/2013 | Gardiner | G09G 5/06 315/13.1 |
| 8,466,915 B1* | 6/2013 | Frueh | G06T 17/05 345/420 |
| 8,493,241 B2* | 7/2013 | He | G01C 23/00 340/945 |
| 8,698,654 B2* | 4/2014 | He | G01C 23/005 340/971 |
| 8,781,790 B2 | 7/2014 | Zhu et al. | |
| 8,977,491 B1* | 3/2015 | McCusker | G01S 13/95 342/26 B |
| 9,347,792 B2* | 5/2016 | Meeker | G01C 21/3638 |
| 9,434,480 B2* | 9/2016 | Wang | B64D 45/04 |
| 2003/0195672 A1* | 10/2003 | He | G01C 23/00 701/3 |
| 2004/0105573 A1 | 6/2004 | Neumann et al. | |
| 2005/0089213 A1 | 4/2005 | Geng | |
| 2006/0208927 A1* | 9/2006 | Poor | G01C 21/00 340/995.1 |
| 2007/0171094 A1 | 7/2007 | Alter et al. | |
| 2008/0158256 A1* | 7/2008 | Russell | G06T 7/32 345/629 |
| 2008/0215204 A1* | 9/2008 | Roy | G05D 1/0044 701/28 |
| 2012/0044476 A1* | 2/2012 | Earhart | G01S 3/7867 356/4.01 |
| 2012/0327189 A1 | 12/2012 | Muramatsu et al. | |
| 2013/0069801 A1 | 3/2013 | Schafhitzel | |
| 2013/0106832 A1 | 5/2013 | Meeker et al. | |

OTHER PUBLICATIONS

Pavel et al.; "Sensor Fusion for Synthetic Vision"; Computing in Aerospace; vol. 8; pp. 1-10; Oct. 21, 1991; XP002950862.

Takacs et al.; "Real-Time Visualization Using a 2D/3D Imaging MMWAVE Radar"; Real Time Imaging VIII; SPIE vol. 5297; pp. 101-105; May 18, 2004; XP040254304.

Extended European Search Report from European Patent Office on co-pending EP application (15857930.0) dated Jun. 13, 2018.

* cited by examiner

SYSTEMS AND METHODS FOR GENERATING IMPROVED ENVIRONMENTAL DISPLAYS FOR VEHICLES

CROSS-REFERENCE TO RELATED APPLICATIONS

This application is the national phase entry, under 35 U.S.C. Section 371(c), of International Application No. PCT/US2015/059209, filed Nov. 5, 2015, which claims the benefit, under 35 U.S.C. § 119(e), of U.S. Provisional Application No. 62/075,724; filed Nov. 5, 2014. The disclosures of the International Application and the US Provisional Application from which this application claims priority are incorporated herein by reference in their entireties.

FEDERALLY SPONSORED RESEARCH OR DEVELOPMENT

Not Applicable.

BACKGROUND

The present disclosure relates to scene imaging and vision systems, and, more particularly, to the fusion of multiple data sources in scene imaging and vision systems.

As used herein, the term "scene" encompasses both terrain (general ground or water surface geography) and man-made and natural obstacles and features, both fixed and mobile (e.g., buildings, trees, vehicles, rocks/boulders, etc.) that may be generalized by the term "non-terrain features" or by the term "obstacles."

Computer generated displays for aircraft and other vehicles have become commonplace in military and civil applications to provide useful information to vehicle operators to allow the operator to have greater awareness of the surrounding environment. These displays may include global positioning system (GPS) data, two-dimensional (2-D) imaging sensor data (such as, for example, from a video camera, IR camera, etc.), three-dimensional (3-D) imaging sensor data (such as, for example, from 3-D radar scene models), and others. These enhanced vision systems can be vital in the control of the vehicles, for example aircraft, especially during take-off, approach, and landing in adverse conditions—such as low light, fog, dust, and other conditions that may restrict an operator's natural vision.

Some displays provide two- or three-dimensional synthetic views of the surrounding environment, and imaging techniques are well known and widely used in the art. Certain imaging technologies are better suited for certain applications. For example, radar imagery is widely used for navigation, surveillance, and reconnaissance, as well as target tracking and identification. Radar imagery is conventionally accomplished by a two-dimensional scan (range and azimuth). An image is rendered from the amplitude of the reflected signals from each resolution cell (azimuth beam width, or step by range resolution length, or range step) by assuming all returns are from a flat plane, which allows transforming from range/azimuth coordinates into a level X, Y Cartesian frame. The resulting image is a plan view with image intensity, grey scale shading, color or some combination thereof, in each basic resolution cell related to the radar return level. These images, created from a top down perspective, are useful in many applications, but suffer from several shortcomings when a view from a different perspective is required such as, for example, from a pilot's perspective. Conventional radar imaging systems do not provide all three coordinate dimensions (there is no elevation angle measurement) of the location of the basic resolution cell to enable the transformation of data (i.e. the image) to another perspective. Thus, they do not present objects at the proper height in the image, from the pilot's perspective.

Some of the current state of the art radar image rendering systems use databases for vertical information. In such systems, the radar sensor location is determined by a precise navigation system, and the two-dimensional image generated, as described above, is registered in absolute coordinates, enabling the use of height data from the database. This approach suffers primarily in two respects: First, there is no capability of detecting objects with a vertical dimension not stored in the database, such as construction towers erected since the database was last updated. Second, the required resolution for some applications is not available, such as is the case when a helicopter is landing in a dust cloud or fog, where a resolution on the order of one foot (30 cm) is required to assure the pilot's situational awareness.

Other technology can help correct some of these problems, such as, for example, laser radar (typically referred to as "lidar," "LiDAR," or "LIDAR), which employs a laser to determine distances to a target, but can often suffer drawbacks of its own. (Laser radar may also be referred to as "ladar," or "LADAR" in various contexts; all are considered within the scope of this disclosure). For example, lidar imaging generally cannot "see" through dust storms, for example, where dust particles scatter or return the laser light with an improper range to the scene. Moreover, a pilot or other vehicle operator cannot aggregate and assess data from multiple sources of varying resolution quickly enough to provide split second reactions that may be needed in dangerous situations.

There is thus a need in the art for an improved system and/or method to provide better imaging that aggregates strengths of various sources in real time to allow quick understanding of and reactions to environmental situations by vehicle operators.

SUMMARY

In one aspect, this disclosure relates to a real-time imaging system for use in a moving vehicle (particularly, an aircraft, but generally land and water vehicles as well) that aggregates pre-existing ("a priori") database data with real-time sensor data to provide a synthetic image of the surrounding environment in real-time. For example, in an aspect, scene data from one or more databases are combined with 3-D point cloud data from one or more 3-D sensors, such as radar and/or lidar, and 2-D information from one or more cameras or other sensors, to create a scene model that is rendered into an image signal for input to a visual display showing a virtual view of the environment in one or more directions around the moving vehicle (for example, in front of, below, or even surrounding a vehicle).

In an aspect, a machine-implemented method for rendering a synthetic view of a scene from one or more 2-D or 3-D sensors acquiring images of the scene is provided, the method including: loading pre-existing scene data; accepting sensor data from the at least one environmental sensor, the data being in the form of a 3-D point cloud; transforming the sensor data from the at least one environmental sensor into a multi-resolution 3-D data structure; fusing the pre-existing scene data with the sensor data to create a combined scene model, the combined scene model comprising a multi-resolution 3-D data structure; and rendering the combined scene model as an image signal for input to a display. In a further aspect, the method uses radar sensor(s), lidar sensor(s), and/or cameras (or other sensors, e.g., sonar) as environmental sensors. In another aspect, the method further includes: weighting aspects of the sensor data from at least first and second environmental sensors to select at least one aspect from a first environmental sensor and at least another aspect from a second environmental sensor; and wherein fusing the pre-existing scene data with the sensor data uses the selected at least one aspect from the first environmental sensor and the at least another aspect from the second environmental sensor.

In another aspect, a non-transitory, machine readable storage medium having stored thereon instructions for performing a method is provided in which the instructions include machine executable code that causes the machine to: load pre-existing scene data from database; accept sensor data from at least one environmental sensor, the data being in the form of a 3-D point cloud; transform the sensor data from at least one environmental sensor into a multi-resolution 3-D data structure; fuse the pre-existing scene data with the sensor data to create a combined scene model, the combined scene model comprising a multi-resolution 3-D data structure; and render the combined scene model as an image signal for input to a display.

In another aspect, a system is provided that includes: a first data source comprising pre-existing scene data providing elevation data; at least one environmental sensor providing real-time data in the form of a 3-D point cloud; a memory containing a machine readable medium comprising machine executable code having stored thereon instructions; and a processor module coupled to the memory, the processor module configured to execute the machine executable code to: transform the sensor data from the at least one environmental sensor into a multi-resolution 3-D data structure; fuse the pre-existing scene data with the sensor real-time data to create a combined scene model, the combined scene model comprising a multi-resolution 3-D data structure; and render the combined scene model as an image signal for input to a display.

This brief summary has been provided so that the nature of the disclosure may be understood quickly. A more complete understanding of the disclosure can be obtained by reference to the following detailed description of the embodiments thereof concerning the attached drawings.

DETAILED DESCRIPTION

The following detailed description describes the present embodiments with reference to the drawings. Any of the embodiments described herein may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a mechanism such as a computer device, and encoding a computer program of instructions for executing a computer process.

Figure 1:
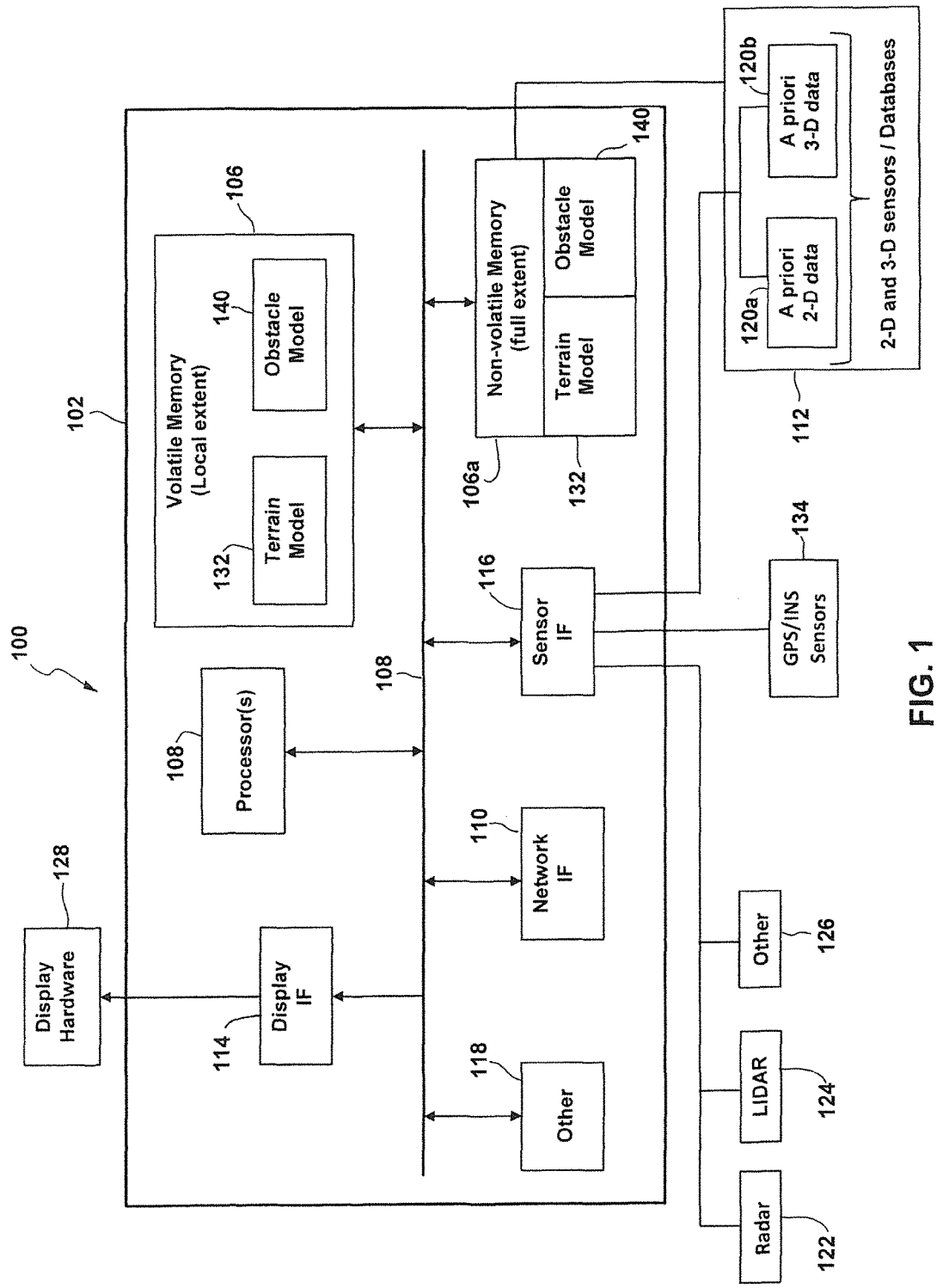
FIG. 1 is a block diagram of an exemplary system for generating an environmental display according to one aspect of the disclosure.

FIG. 1 is a block diagram of a system 100 configured for use with the present embodiments and may be implemented in full or in part in a vehicle, such as an airplane, a helicopter, a car, a truck, a tank, a submarine, or the like. The system 100 may include a computing system 102. The computing system 102 may include one or more processors 104, also known as a central processing unit (CPU). Processor(s) 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. For example, a processor 104 may also include a special-purpose graphics processing unit (GPU) for rendering graphics to a display.

Each processor 104 executes computer-executable process steps and interfaces with an interconnect or computer bus 108. The computer bus 108 may include, for example, a system bus, a Peripheral Component Interconnect (PCI) bus (or PCI-Express [PCIe] bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), and/or any other interconnect type. The computer bus 108, in the illustrated exemplary embodiment, connects each processor 104 to memory (including, preferably, a non-volatile memory component 106a and a volatile memory component 106b), a network interface 110, a display interface 114, and one or more sensor interfaces 116. In an aspect, the bus 108 may also provide connections to other devices 118, which may include other input and/or output devices and interfaces, such as for example a keyboard interface, a pointing device interface, etc. Details regarding the other devices 118 are not germane to the embodiments disclosed herein.

As described, the computing system 102 includes a storage device 112, which may include for example a hard disk (HDD), a solid state drive (SSD), a hybrid drive (sometimes referred to as an SSHD), a CD-ROM, a non-volatile memory device (flash or memory stick) and/or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program. Storage 112 further stores 2-D a priori scene data 120a (e.g., satellite imagery) and/or 3-D a priori scene data 120b, according to an aspect, as will be described below. The a priori scene data 120a, 120b may include one or more databases of digital scene elevation data, such as, for example, DTED, ALIRT, BuckEye, HALOE, and/or others. This scene data preferably include 3-D data that map elevations to digital coordinates, such as GPS coordinates, latitude and longitude coordinates, or the like. Generally this data can be represented as elevation data on a constantly spaced grid. The a priori data 120a, 120b may be previously-collected sensor data compiled in one or more databases in storage 112, and/or data transferred from the non-volatile memory 106a to one or more databases in storage 112 after completion of the flight, trip, or mission of the vehicle using the system 100. Data from the non-volatile memory 106a may also be sent to the non-volatile memory of another vehicle (not shown).

Memory 106a, 106b also interfaces with the computer bus 108 to provide the processor(s) 104 with access to memory storage. Memory 106a, 106b may include random access main memory (RAM). When executing stored computer-executable process steps from storage 112, the processor(s) 104 may store and execute the process steps out of memory 106a, 106b. Examples of program modules that may be stored in memory 106a, 106b include scene models, specifically a terrain model 132 and an obstacle model 140. As described, the models 132, 140 may comprise computer executable instructions that are stored in storage 112, and all or portions of them may be loaded into memory 106a, 106b for execution by the one or more processors 104. In an aspect, the terrain model 132 and the obstacle model 140 use data sources, such as the a priori scene data 120, to create a virtual model of the scene, as will be described in more detail below. In an aspect, the obstacle model 140 may accept input from the sensors 122, 124, 126 and analyze the data to determine if various aspects of the data indicate terrain or non-terrain obstacles, as will be described in more detail below. Read only memory (ROM, not shown) may also be used to store invariant instruction sequences, such as start-up instruction sequences or basic input/output system (BIOS) sequences for operation of a keyboard (not shown).

In some aspects, it may be advantageous to configure the volatile memory 106b to store "local extent" data, i.e., data relating to a region within a defined range of the vehicle, such as out to a visible horizon, while the non-volatile memory 106a is configured to store "full extent" data, i.e., data relating to the region beyond the defined range, to the preconfigured limits of the memory. According to some aspects, most, and preferably all, processing is advantageously done using data from the volatile memory 106b. Data from the non-volatile memory 106a is retrieved and stored in the volatile memory 106b as the vehicle moves and is processed as necessary. Storage 112 is updated from the non-volatile memory 106a, which, as mentioned above may also transfer data, post-mission to offline memory (not shown). The non-volatile memory 106a may also transfer data (e.g., wirelessly) to another vehicle during, for example, a joint mission.

In an aspect, the computing system 102 may include a network interface 110 for connection with a wired or wireless network, such as, for example, a cellular network, a satellite network, an Ethernet network, or the like, for connection to a public network (like the Internet) or private network. Such a connection may allow the download of data for use in the imaging systems disclosed, the download of software updates, and/or communications with other processing systems. It should be noted, however, that a network interface is not required, and it may be omitted altogether in some aspects of this disclosure.

The computing system 102 also includes one or more sensor interfaces 116, which accept real-time 2-D or 3-D input from active environmental sensors such as radar 122, lidar 124, and/or one or more other sensors 126. For example, another sensor 126 may include a camera (still or video) operable in the visible or various infrared (IR) portions of the E-M spectrum. In a submarine embodiment, the other sensor 126 may include a sonar sensor. It is to be understood that, while three active environmental sensors 122, 124, 126 are described in this disclosure, more than three active environmental sensors of various types may be employed, and, in certain aspects, less than three such sensors may be employed.

The processor(s) 104 operate programs out of memory, such as a scene model 132 and an obstacle model 140, to process the image data (comprising a priori scene data 120a, 120b, radar 122 data, lidar 124 data, and/or other sensor 126 data), and to combine the processed image data to create a model of the environment, generally relative to a vehicle, such as a helicopter or other aircraft, a land vehicle, or watercraft. This modeled environment will generally provide a more accurate picture of the surrounding environment than any one data source could provide on its own. The processor(s) 104 can then render a digital, synthetic image of the surrounding environment and, through a display interface 114, display some portion of the surrounding environment with a display 128 to an operator. In various aspects, the display 128 may include one or more of a general purpose computer screen, such as an LCD screen, a heads-up display (HUD), a head-mounted display (HMD), a virtual reality display, and the like.

The sensor interface 116, in some aspects, may advantageously receive navigational data in real time from one or more navigational sensors 134, which may include a Global Positioning System (GPS) receiver and/or an Inertial Navigation System (INS) sensor. The navigation data are input to the processor(s) 104 through the sensor interface 116 and the computer bus 108.

Figure 2:
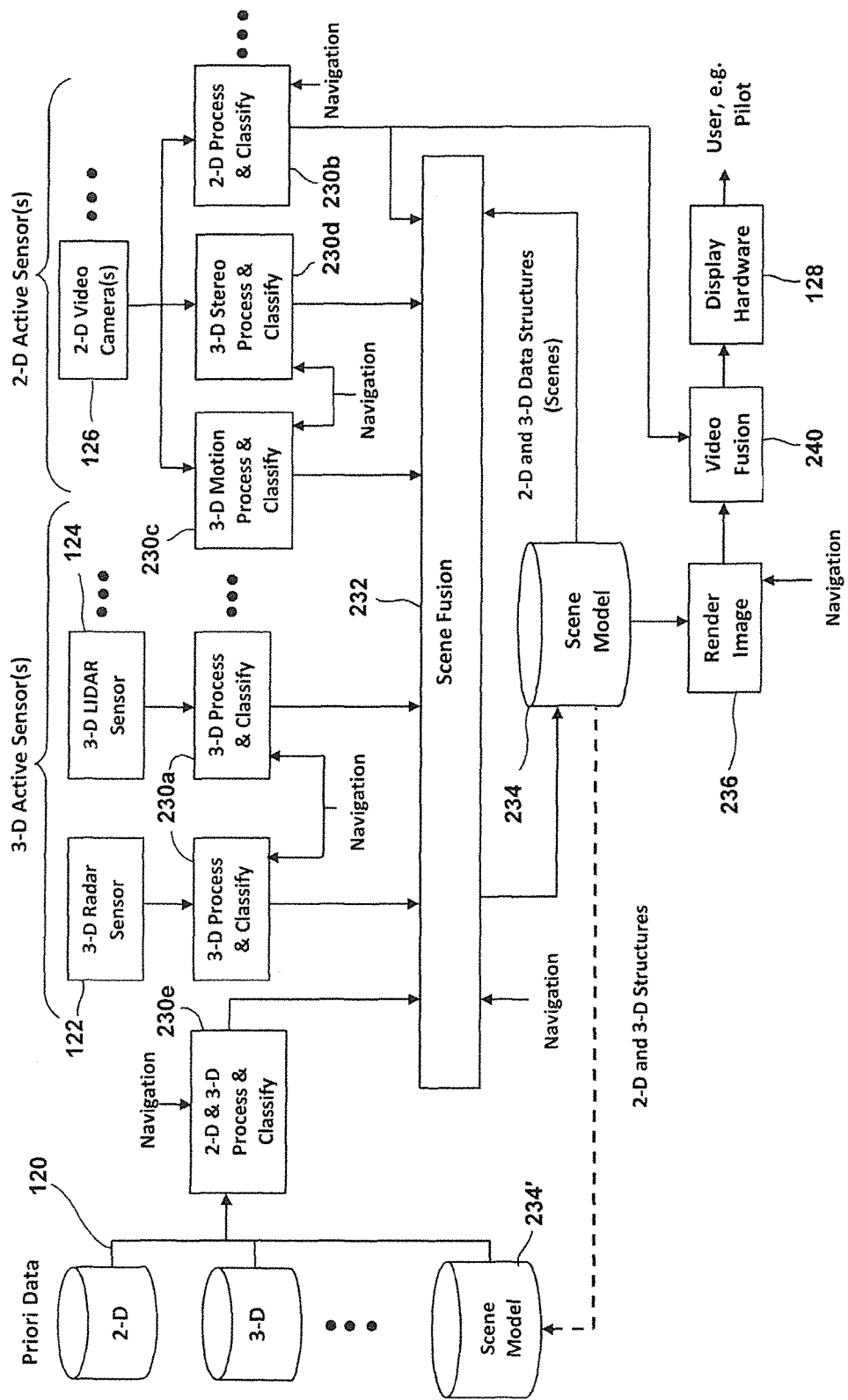
FIG. 2 is a block diagram of the general architecture of the data acquisition and processing modules that may be used in embodiments of the system of FIG. 1.

Turning to FIG. 2, a sample module data flow is described. The data flow shown in FIG. 2 can operate on a system such as that described in FIG. 1 or another computer system having appropriate hardware and software to accomplish the tasks as described herein. Initially, one or more sources of a priori scene data 120 and one or more active, real-time sensors (shown here, in a non-limiting example, as 3-D radar 122, 3-D lidar 124, and a 2-D video camera 126) are used to provide an enhanced virtual view of an operating environment at a given location. Typically this will be the location of a vehicle in which the present systems are operating, but this can also be employed in a distributed environment or applied to model distant locations in accordance with the teachings herein.

Generally, data from each data source (a priori data and active environmental sensor data) will be processed through an associated one of a plurality of process and classify modules 230*a-e*, each of which performs operations on the data sets it receives from its associated data source to normalize the data sets, and, in some aspects, also to classify elements within the received data sets, as described more fully herein. The process and classify modules 230*a-e* may be configured to process 2-D data, 3-D data, or both. In the illustrated embodiment, output data from the 3-D sensors, such as the radar sensor 122 and the lidar sensor 124, are provided as 3-D point cloud data sets or structures to process and classify modules 230*a*, yielding 3-D scene data structures. 2-D sensors, such as the camera 126, advantageously provide 2-D video imagery to at least one 2-D process and classify module 230*b* to yield 2-D video imagery. In some embodiments, the 2-D video imagery may be converted to a 3-D point cloud by using a "structure from motion" technique implemented by a 3-D motion process and classify module 230*c* and/or by using a "structure from stereo" technique implemented by a 3-D stereo process and classify module 230*d*, thereby yielding 3-D scene data structures. The 2-D and 3-D a priori data 120 are input to a 2-D and 3-D a priori process and classify module 230*e* to yield 2-D and 3-D scene data structures.

Advantageously, at least one of the process and classify modules 230*a-e* may be configured to receive navigation data (GPS and/or INS) from the above-described navigation sensor(s) 134. In various aspects, each of the process and classify modules 230*a-e* may be a single module capable of operating on different data sets, may be different instances of the same or similar modules, may be disparate modules operating on different types of data, may be combinations of the same, or the like. In an aspect, for example, each data type may operate on a different assigned processor 104 with a different instance of a process and classify module dedicated to that specific type of data. One or more of the process and classify modules 230*a-e* may also help define an active area of the scene to be modeled. Generally, this will be a specified area around a vehicle implementing the systems and methods herein. In one example, an aircraft system may define the active scene area to be a roughly square region surrounding the aircraft's location, where the square is approximately 67 km on a side, so as to coincide with or be larger than a visual horizon. The shape and size of active areas may be different in various aspects, and the speed and direction of travel of the vehicle may factor into a determination of the active area. Moreover the sensor range may also factor into the active area. While one or more of the process and classify modules 230*a-e* associated with the active environmental sensors 122, 124, 126 may also clip sensor data sets to an active area, the sensor data sets may also simply be limited to their effective ranges in some aspects.

The scene data structures and video imagery from the process and classify modules 230*a-e* are then combined by a scene fusion module 232 to create a real-time combined scene model 234, that may be stored, for example, in a random access memory (RAM). The scene fusion module 232 may be configured to accept processed data sets from any number and combination of 2-D and/or 3-D active (real-time) environmental sensors, as well as a priori data and navigation data. The combined scene model 234 can then be processed by an image rendering module 236 to create an image for the visual display 128. In an aspect, 2-D video imagery data from the 2-D process and classify module 230*b* may be combined with the output from the image rendering module 236 in a video fusion module 240 before output to the visual display 128. As described above, the display 128 may include a computer screen, a heads-up display, a head-mounted display, a virtual reality display, or the like.

In the exemplary embodiment shown in FIG. 2, each time a combined scene model 234 is updated or revised by input from the fusion module 232, data reflecting the updated/revised combined scene model 234 may be fed back in real time to the fusion module 232 to assure that the scene model 234 is fused with the data structures from the active environmental sensors in real time. The scene model 234 is thus continuously updated to match what is currently being detected by the active sensors 122, 124, 126. Optionally, 2-D and 3-D data structures from the combined scene model 234 may be input to an a priori scene model database 234' included in the a priori data 120. Furthermore, navigation data from the above-mentioned navigation sensors 134 (FIG. 1) may be input into one or more of the process and classify modules 230*a-e* (preferably all of them), as well as directly into the scene fusion module 232, as noted above.

As mentioned above, a priori scene data 120 may comprise one or more of HALOE data, BuckEye data, ALIRT data, previously sampled or collected environmental sensor data, and/or DTED (Digital Terrain Elevation Data). For example, ALIRT is a high altitude lidar operations experiment database, and HALOE is an airborne lidar imaging research testbed database. Additionally, DTED is a digital elevation model available from the National Geospatial-Intelligence Agency (NGA) that can provide various levels of data, such as approximately 900 meter, 90 meter, 30 meter and even greater granularity. Similarly, BuckEye data originates with the US Army Corps of Engineers and provides high-resolution, high-accuracy elevation data for various locations. While several exemplary data sets for scene model data have been included herein, no specific data source is required for the a priori scene data 120, and one or more of these examples may be used or other similar data sets may be included or substituted. In general, a priori scene data sources 120 are military, other governmental, and/or civilian geospatial data sets that can provide elevation data for geographical coordinates and that can be used to generate 3-D models of various locations. As noted above, the a priori scene data sources 120 may advantageously include both terrain data (e.g., ground elevation data) and obstacle data related to more or less fixed structures (e.g., buildings, power lines, cellular and other towers, bridges, trees, rocks/boulders), as well as stationary but movable objects. As previously mentioned, the a priori data may include 2-D data, such as, for example, satellite imagery.

In an aspect, various a priori scene data sources 120 may have different levels of granularity within and/or among the data sets. They may also differ in certain respects due to factors such as the inclusion of man-made structures, the time during which the data were gathered, and the like. As such, it may be preferable to merge two or more a priori scene data sources 120. This merger may occur through the a priori process and classify module 230e, which, in an aspect, normalizes the data sources and combines them. Normalization operations may include selecting appropriate geographical areas within the data sets, sampling the data to provide a consistent level (or multiple levels) of granularity, shifting one or more of the data sets to align them, and the like. In an aspect, the a priori scene data sets 120 may be combined into a multi-resolution 3-D data structure, such as a quad or oct tree database structure which supports multiple resolution grids. The multiple resolution grids may include, for example, granularity from between about 100 meters (110 yards) to about 15 cm (6 inches). The a priori scene data sources 120 may be processed into a quad or oct tree database format by the process and classify module 230e, for example. In another aspect, the a priori scene data sources 120 may comprise only one level of resolution, which can be thought of as a constantly spaced grid of elevation data.

In an aspect, the a priori process and classify module 230e may further process the a priori data to locate and identify structures that are not geological formations. For example, comparisons between different data sources may provide a way to identify buildings, roads, bridges, towers, and other structures. For instance, one scene data source 120 may include strictly geological terrain elevation data, whereas another scene data source 120 includes man-made structures. Comparing these two sources may allow identification of buildings or other man-made structures.

Similarly, sensor data may also be processed by one or more of the process and classify modules 230a, 230b, 230c, and 230d. In the embodiment illustrated in FIG. 2, the radar sensor(s) 122, the lidar sensor(s) 124, and the camera (or other sensors) 126 feed data into the process and classify modules 230a, 230b, 230c, and 230d. In an aspect, as discussed above, radar data 122 and lidar data 124 are provided as 3D point cloud data, which is typically not in a constantly spaced grid like the a priori scene data 120. In one aspect, it can be considered that a priori scene data 120 are generally provided in a typical (x, y, z) 3-D Cartesian coordinate system, whereas sensor data from radar and lidar sensors are generally data emanating from a particular point, as in a typical (r, θ, φ) polar coordinate system. Furthermore, closer sensor data are typically more densely sampled than more distant data. In order to combine these disparate types of data, the process and classify modules 230a-d associated with the sensors, particularly the process and classify modules 230a, 230b respectively receiving radar and lidar data, may transform the point cloud data into a multi-resolution nested regular grid (such as a quad or oct tree data structure).

Although the illustrated embodiment shows four sensor-associated process and classify modules 230a-d, it is understood that fewer than four or more than four may be used, depending on the number and types of active environmental sensors employed. Similarly, more than one process and classify module 230e associated with the a priori data may be employed, depending on the desired capabilities and specific configuration of the system.

Additionally, in some aspects, the radar 122, lidar data 124, and other (e.g. camera or sonar) data 126 may go through a classification process to locate and identify movable and/or moving obstacles, such as, for example, vehicles, people, animals, temporary structures, and the like. Such obstacles may include generally movable objects and structures that would typically not be found in the a priori scene data 120. For example, radar 122, lidar 124, and cameras 126 may be able to identify moving or stationary vehicles that—due to their mobile nature—would not generally be included in the a priori scene data 120, yet nevertheless may be obstacles that a vehicle operator using this system may wish to avoid. In an aspect, the obstacle model 140 (FIG. 1) may be included in or work in conjunction with one of the process and classify modules 230a-e to carry out obstacle identification tasks.

Figure 3:
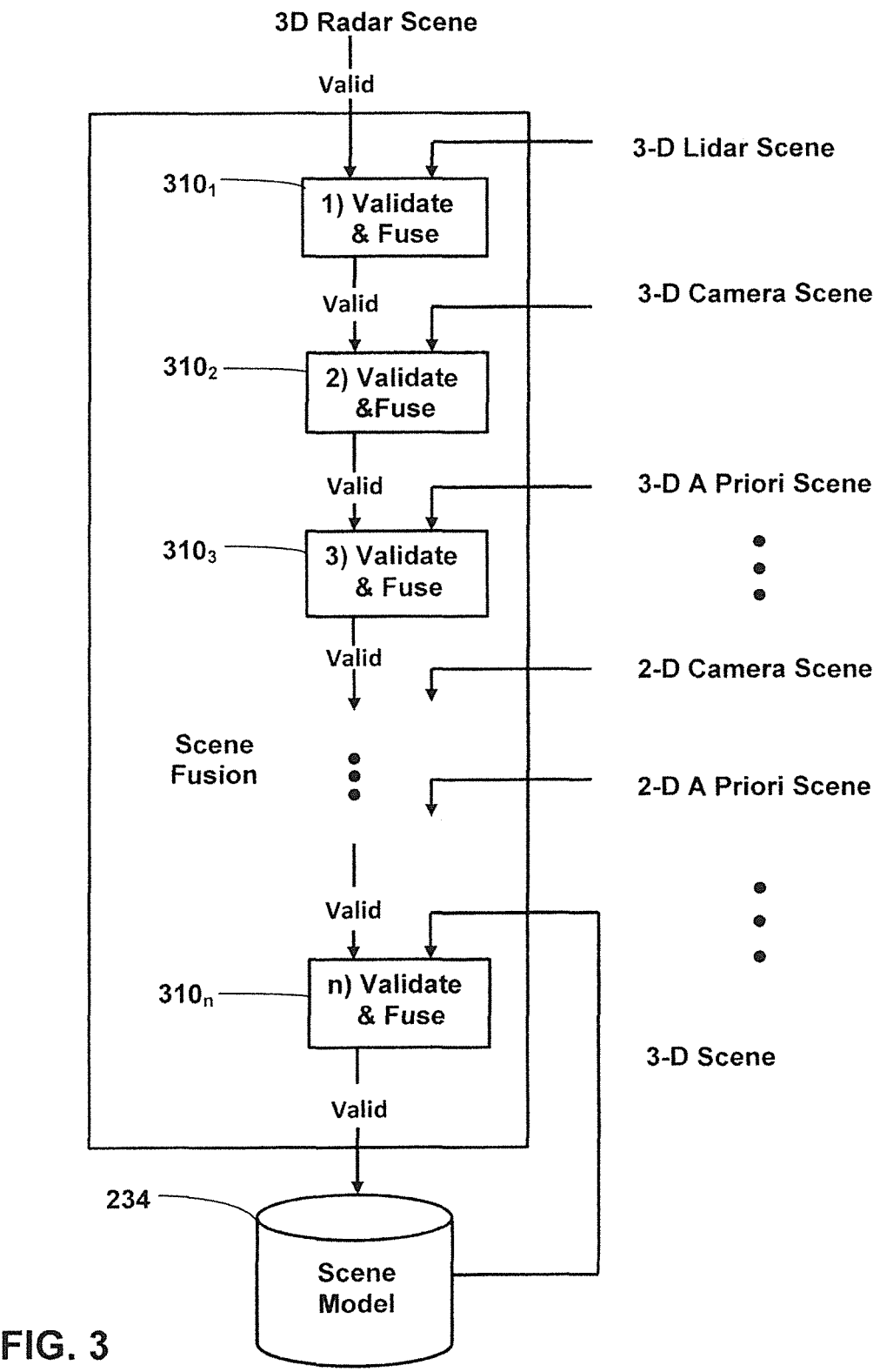
FIG. 3 is a functional flow chart of an example of the sensor fusion logic that may be used in the exemplary system of FIG. 1.

FIG. 3 illustrates an exemplary architecture that may be employed to combine sensor data and a priori data in the scene fusion module 232 shown in FIG. 2, according to an aspect of the disclosure. In this exemplary embodiment, the scene fusion module 232 comprises a series of n validate and fuse submodules $310_{1-n}$, each of which receives and validates one type of scene data or video image data from a process and classify module, such as the process and classify modules 230a-e described above. (The logic of the validate and fuse submodules $310_{1-n}$ will be described below.) For the purposes of this discussion, the term "validate" is defined as the process of assuring that terrain-related data and obstacle-related data in the sensor signal(s) (and, optionally, terrain-related and obstacle-related a priori data) represent the actual scene encountered by the vehicle, without atmospheric or environmental obscurants, and without "noise" (interference) from extraneous sources, such as obscurants. The logic of FIG. 3 can be adapted to accommodate the number of sensors used in the system of FIG. 2, which, as noted above, may be varied to suit the needs of a specific mission. Thus, validate and fuse submodules may be reconfigured (for a different type of data), added, or removed, as needed.

The validate and fuse submodules $310_{1-n}$ are cascaded, so that each successive submodule receives data validated by all previous modules as well as newly-received data from its associated sensor or a priori database. Each submodule validates the newly-received data, which are then fused or combined with the previously-validated data before being passed on to the next successive submodule in the cascade. This logic assures, as new sensor (or a priori) data are accepted by a submodule, that the new data are validated against previously-validated data. If the new data are valid, then the combined data output from that submodule are validated as being the highest quality data available before being passed to the next successive submodule.

The scene fusion module 232, in many embodiments, may have its first validate and fuse submodule $310_1$ configured to receive data from the radar sensor 122, because radar data are usually deemed valid based on known physical principles. Specifically, radar can "see" through most atmospheric obscurants (e.g., dust, snow, smoke, haze, fog), although it may not be reliable ("valid") in heavy rain. Nevertheless, the radar data are mathematically tested to assure validity, using known methods for testing, e.g., for a failed sensor or non-scene content. Because of its presumptive validity, radar data may be used to perform overall data validation in the scene fusion module 232.

Ultimately, the final validate and fuse submodule $310_n$ outputs the combined (fused) and validated sensor and a priori data to update the scene model 234. Advantageously, the updated scene model data may be fed back to the final validate and fuse submodule $310_n$ to assure validation of the total updated scene data.

Figure 4:
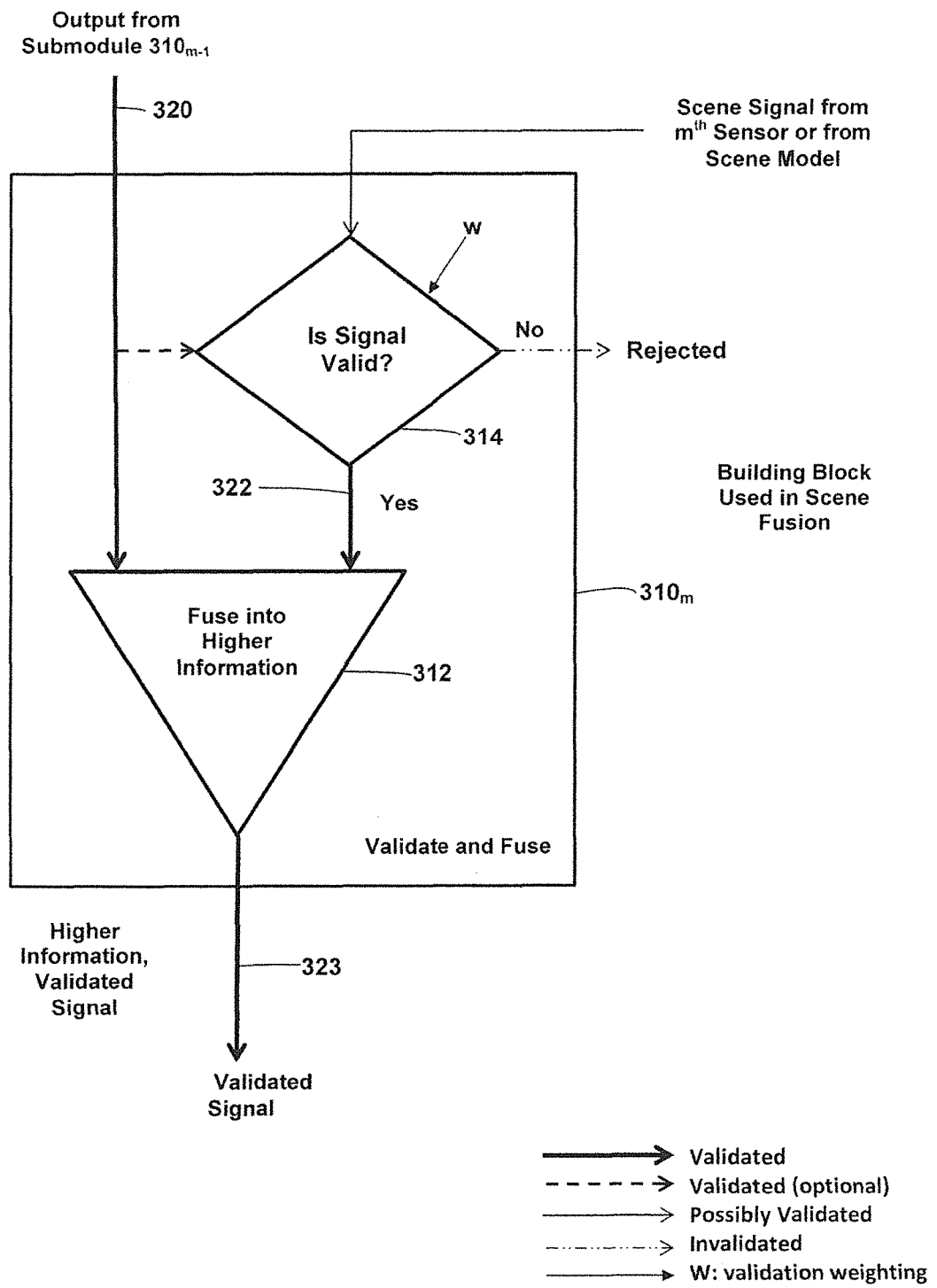
FIG. 4 is a functional flow chart of an example of a validation and fusion module that may be used in the sensor fusion logic of FIG. 3.

FIG. 4 illustrates an exemplary logic diagram of one validate and fuse submodule $310_m$, which will represent any one of the validate and fuse submodules $310_{1-n}$. The submodule $310_m$ includes a functional data fusion block 312 and a data validation decision block 314. The data fusion block 312 receives, as a first input signal 320, the fused and validated data from the previous submodule $310_{m-1}$ (unless the submodule $310_m$ is the first submodule $310_1$, in which case the fusion block 312 receives, as a first input, the presumptively valid radar data 122). The data of the first input signal 320 are known (or presumed) to be valid either because of physical principles, or as a result of a mathematical process that demonstrates validity. For example, the system could mathematically verify that the range of lidar returns is appropriate for the encountered conditions (e.g., a few meters if fog or dust surrounds the vehicle; hundreds of meters in clear air conditions). The data in the first input signal 320, having been classified as terrain-related or obstacle-related at each point on an x-y-z grid within, for example, the previous sensor's field of view, is considered valid at each of the points of the grid.

A scene signal 321 (carrying terrain and/or obstacle data from a sensor, an a priori database, or the scene model 234) is received by the decision block 314, where its data may be validated by a comparison to the fused and validated data of the first input signal 320, if validation of the scene signal data is desired on a point-by-point basis. The comparison may be based on quantitative comparisons of one or more physical parameters, e.g., 2-D intensity, spatial resolution, standard deviations from predetermined positional estimates, etc. For example, the distance between the same two scene objects indicated by each of the signals 320 and 321 may be compared to each other or to a predetermined distance, and if the distance indicated by the scene signal 321 meets the required comparison criteria, the corresponding data are considered valid. In some embodiments, if validation of scene signal data is based on more than one comparison criterion or test, a weighting factor W may be used to give each test or criterion the appropriate weight. In other embodiments, the weighting factor W may be used to scale the required comparison criteria. Alternatively, without a point-by-point comparison with the first input signal 320, the scene signal 321 may be validated as a whole by using physical criteria. For example, it may be determined whether the scene signal 321 signal meets predetermined spatial resolution and intensity criteria, optionally with a weighting factor.

If any of the data of the scene signal 321 are determined to be invalid, the invalid data are rejected from the scene model, although they may be used for other decision-making, such as, for example, situational awareness. Any of the data of the scene signal 321 that are determined to be valid are provided by a second input signal 322 to the data fusion block 312, where they are fused or combined with the previously-fused and validated data provided by the first input signal 320, in accordance with known statistical hypothesis testing techniques. In one aspect, for example, the fusion block 312 may determine, on a point-by-point basis, which of the input signals 320, 322 includes data with better resolution, intensity, and/or precision, and then use that data for the fused and validated output signal 323. Thus, the output signal 323 of the fusion block 312, and thus of the submodule $310_m$, is a signal with improved data (compared to the data of the first input signal 320) by the addition of the validated data from the scene signal 321. The validated data of the output signal 323 is then input to the next successive validate and fuse submodule $310_{m+1}$, or if the submodule $310_m$ is the final submodule in the cascade (see FIG. 3), to the scene model 234.

By way of further explanation, assume a candidate fusion architecture in which a radar sensor and a lidar sensor standalone supply inputs to the fusion architecture. For this architecture, the radar signals are considered valid at all times, because the radar is able to image a scene through obscurants (except heavy rain, in which the signal can be attenuated). Consequently, the radar signal is used to validate the lidar data. If the lidar data are validated, the lidar data are fused with the radar signal to produce a higher information content signal that is the output from this fusion submodule. This validated signal is then passed on for further processing, either being passed to another fusion submodule to serve as the validation source, or installed in the scene model 234 as the valid representation of the scene.

If any of the data from any sensor are declared invalid (e.g., appear to be a measure of obscurants rather than the scene), then the invalid data are rejected, although they may be used in other decision-making, such as, for example, situational awareness. Thus, even if some of the data in a signal are rejected, the fusion submodule $310_m$ is still active, because the valid data are passed through it, without modification, to the next level (submodule) of fusion.

Each sensor, each a priori data set, and the scene model are continuously monitored for validity using a cascade of fusion submodules 310 like that shown in FIG. 3, or whatever variant is suitable for the particular mission. Consequently, the information that reaches the final submodule $310_n$ of the cascade is eventually stored in the scene model 234, and this validated data represent the highest quality available of the scene.

In a particular example, the radar data is assumed be valid, but of a lower resolution than the lidar data, while the lidar data are assumed higher resolution (higher "quality") than the radar data but not always valid. Assume a vehicle with this fusion system is traveling and suddenly encounters heavy obscurants (e.g. dust or fog). Prior to encountering the obscurants, the lidar was collecting valid, high resolution data of the scene, and this data were stored in the scene model 234. Once the vehicle moves into the heavy obscurants, the lidar becomes unable to image the scene through the obscurants. The radar, however, is able to image the scene through the obscurants. If the scene suddenly changes due to a moving object entering the vehicle's path ahead of the vehicle, the lidar data will not image the scene change resulting from the moving object. At this point, the scene model that was collected by the lidar prior to the encountering of the obscurants is no longer accurate. However, the radar still actively images the scene and will detect and image the moving object, and the scene model is updated with the radar data at the location of the moving object. The scene model now contains information about the moving object. This happens even though the radar data is lower resolution than the lidar data that was stored in the scene model. Lower resolution, validated data, such as radar data, will replace higher quality lidar data, because the radar data are timelier and contain new information. In addition, this new radar information has invalidated the previous lidar data collected in the area of the moving object.

In a second particular example, assume the vehicle is traveling and suddenly encounters heavy obscurants. Prior to encountering the obscurants, the lidar was collecting valid, high resolution data of the scene, and this data were stored in the scene model. Once the vehicle moves into the obscurants, the lidar goes "blind." At this time, the radar continues to image the scene. Assume no changes occur in the scene. In this case, the radar data validates the scene model. Since the scene model contains high quality lidar data prior to the encountering of the obscurants, the scene model does not change. Because the high quality scene model is valid with respect to the radar data, the scene model is not modified by the lower resolution (compared to the lidar) radar.

In summary, the scene model always contains the highest resolution valid sensor data available.

Figure 5:
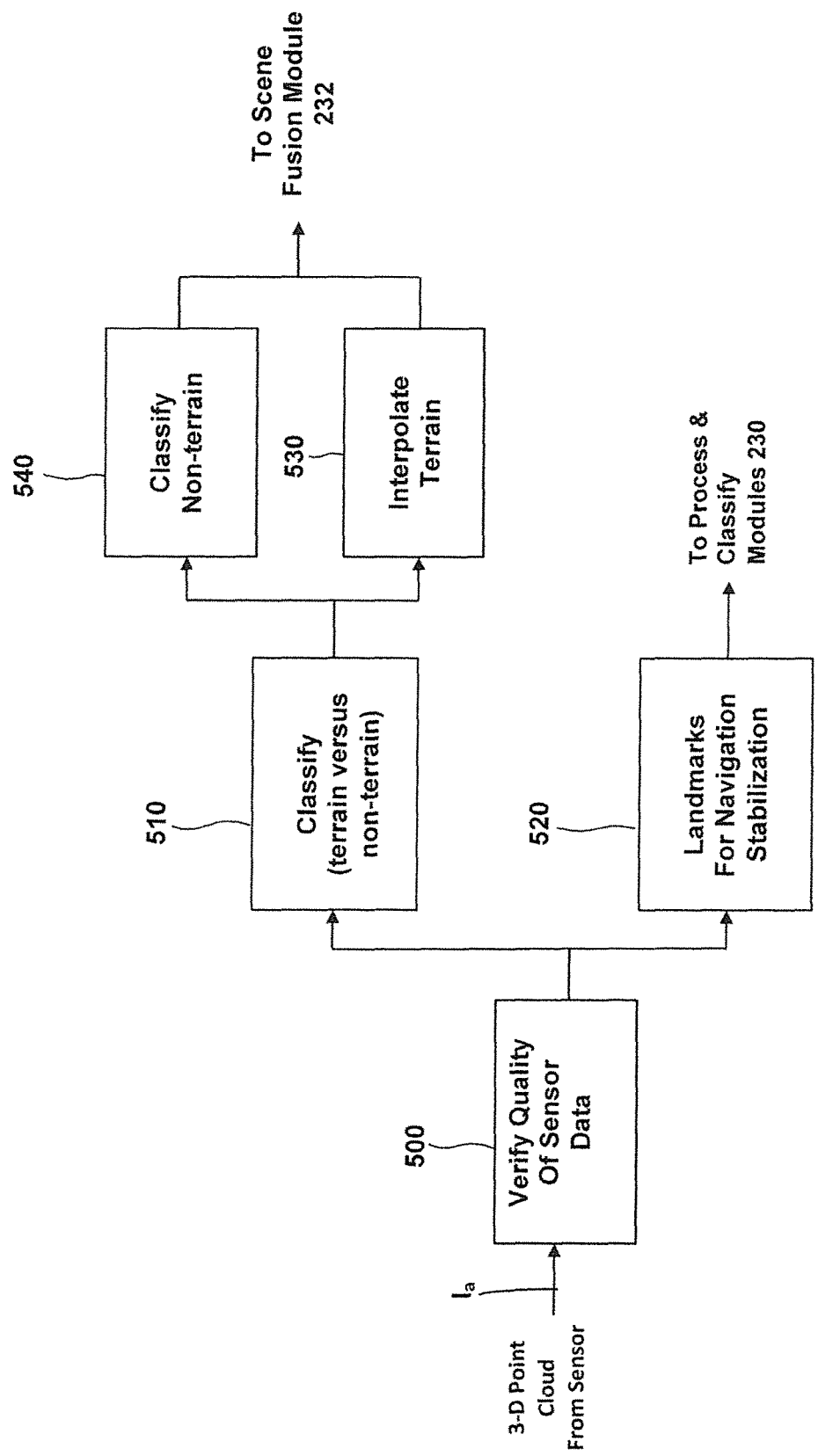
FIG. 5 is a block diagram illustrating a "process and classify" function according to a first aspect of the disclosure.

FIG. 5 is a block diagram showing the operation of an exemplary 3-D process and classify modules 230a (FIG. 2) according to an aspect of the disclosure. The input $I_a$ includes sensor data in a 3-D point cloud of the scene (possibly including atmospheric obscurants), as provided by a 3-D radar 122, a 3-D lidar 124, and/or another 3-D sensor (not shown). The 3-D point cloud sensor data of the input I is first subjected to quality verification in a function block or step 500 to determine if the data conform to the scene and not obscurants or to a failed sensor. The output of the function block or step 500 is a data signal that is a timely and valid representation of the scene, without obscurants.

The data in the output from the quality verification block or step 500 are next classified as terrain or non-terrain (classification block or step 510). The data are also searched, in navigation stabilization block or step 520, to find information indicating objects that may be considered landmarks, with such landmark-indicative information being used to motion-stabilize the sensor data. The navigation stabilization block or step 520, which may advantageously employ conventional Kalman filtering methods to estimate the navigation state, may be operative before, after, or simultaneously with the classification block or step 510. The output of the navigation stabilization block or step 520 is the input to the 3-D process and classify modules 230a (FIG. 2).

After the classification block or step 510, the terrain data are operated on by an interpolation block or step 530, in which gaps in the terrain data (caused by, e.g., obscurants, distortion, errant reflections, etc.) are filled in by an interpolation algorithm, such as a bilinear algorithm (as is well-known in the art), or other methods that may, for example take advantage of terrain shape and physical sensor constraints to produce a natural-looking scene. The non-terrain data yielded by the classification block or step 510 are advantageously operated on by a second, or non-terrain, classification block or step 540, in which the non-terrain data are further classified as to the type of object (e.g., tree, building, tower, etc.). The outputs from the terrain interpolation block or step 530 and the non-terrain classification block or step 540, are fed to the scene fusion module 232 (FIG. 2).

Figure 6:
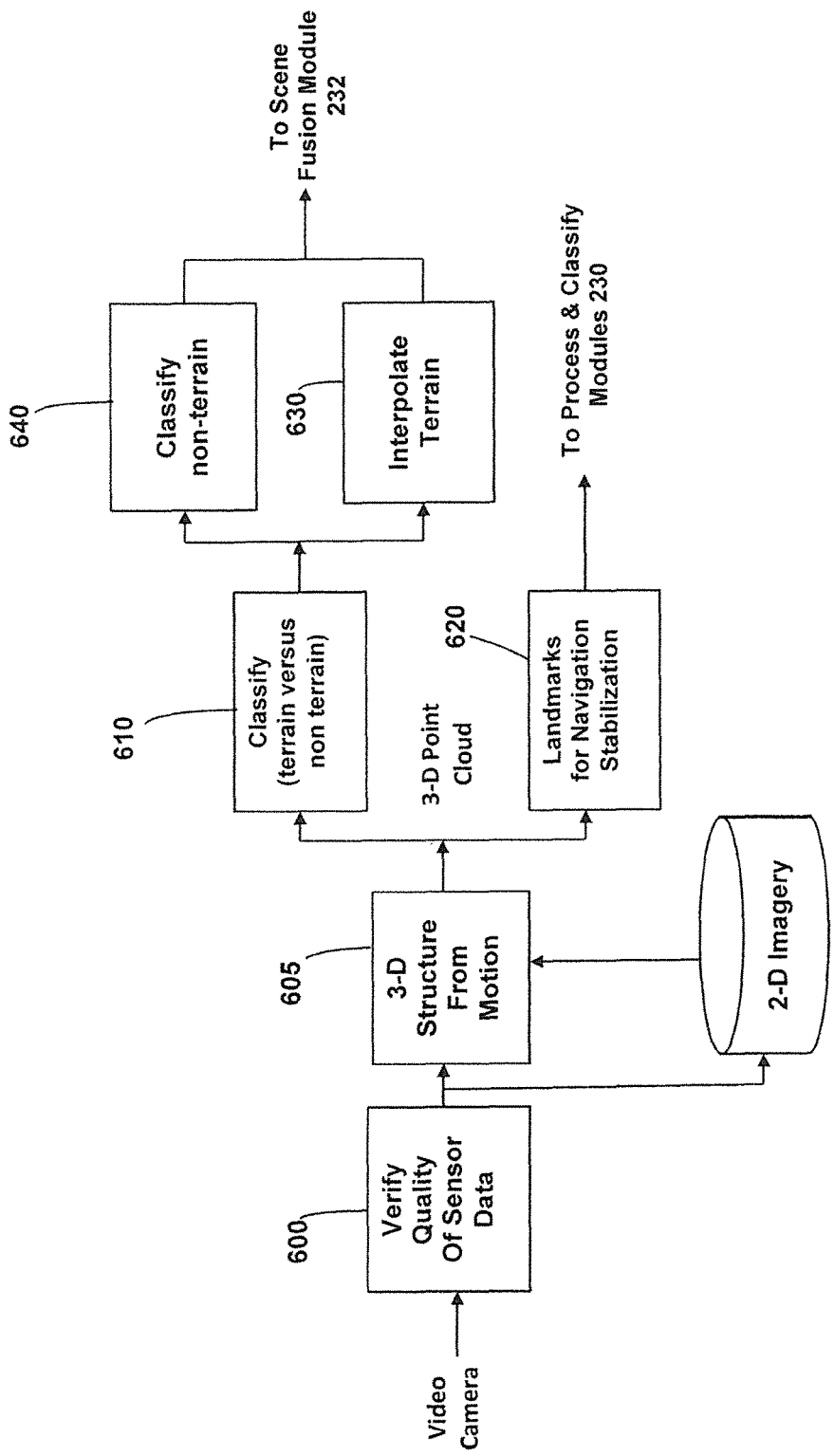
FIG. 6 is a block diagram illustrating a 3-D motion process and classify function according to another aspect of the disclosure.

FIG. 6 is a block diagram showing the operation of an exemplary 3-D motion process and classify module 230c (FIG. 2) according to an aspect of the disclosure. The input $I_c$ includes a video stream of 2-D imagery from a video camera 126, which, as mentioned above, may operate in the visible or IR portions of the E-M spectrum. The input $I_c$ is directed to a quality verification block or step 600, which verifies the quality of the 2-D imagery to determine if it conforms to the scene and not to obscurants or a failed camera. The output from the quality verification block 600, which is data providing a timely and valid representation of the scene (excluding obscurants), is directed to the appropriate a priori database 120 and to a 3-D structure-from-motion block or step 605. The structure-from-motion or step 605, which combines the current verified 2-D imagery data from the verification block or step 600 with previously-captured 2-D imagery data from the a priori database 120, uses a conventional structure-from-motion algorithm to convert the 2-D imagery into a 3-D point cloud. See, e.g., Y. Ma et al., "An Invitation to 3-D Vision: From Images to Geometric Models," Springer-Verlag New York, Inc. (2004), ISBN-10:0-387-00893-4. The data in the 3-D point cloud output from the structure-from-motion block or step 605 are next classified as terrain or non-terrain (classification block or step 610). The 3-D point cloud data are also searched, in a navigation stabilization block or step 620, to find information indicating objects that may be considered landmarks, with such landmark-indicative information being used to motion-stabilize the sensor data. The navigation stabilization block or step 620, which may advantageously employ conventional Kalman filtering methods to estimate the navigation state, may be operative before, after, or simultaneously with the classification block or step 610. The output of the navigation stabilization block or step 620 is of the 3-D motion process and classify module 230c (FIG. 2).

After the classification block or step 610, the terrain data are operated on by an interpolation block or step 630, in which gaps in the terrain data (caused by, e.g., obscurants, distortion, errant reflections, etc.) are filled in by an interpolation algorithm (e.g., a bilinear algorithm), as is well-known in the art. The non-terrain data yielded by the classification block or step 610 are advantageously operated on by a second, or non-terrain, classification block or step 640, in which the non-terrain data are further classified as to the type of object (e.g., tree, building, tower, etc.). The outputs from the terrain interpolation block or step 630 and the non-terrain classification block or step 640 are fed to the scene fusion module 232 (FIG. 2).

Figure 7:
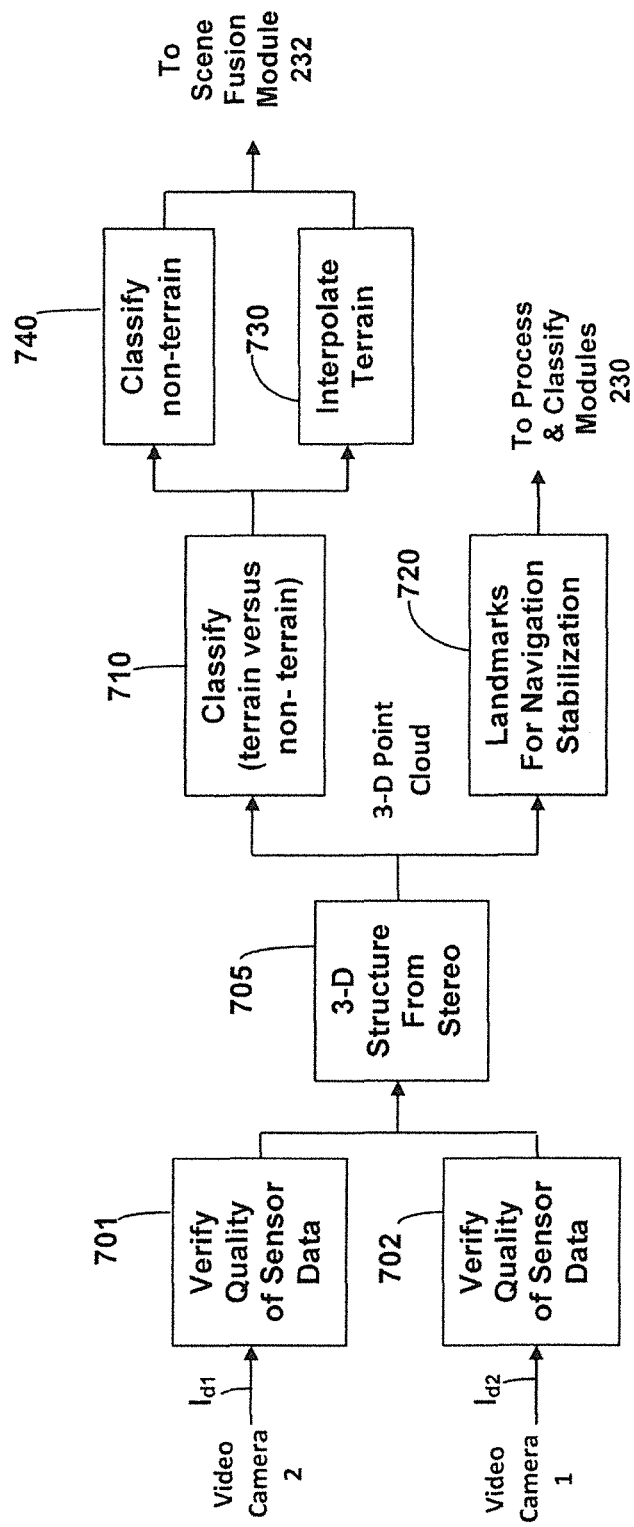
FIG. 7 is a block diagram illustrating a 3-D stereo process and classify function in accordance with a further aspect of the disclosure.

FIG. 7 is a block diagram showing the operation of an exemplary 3-D stereo process and classify module 230d (FIG. 2) according to an aspect of the disclosure. The inputs $I_{d1}$ and $I_{d2}$ include video streams of 2-D imagery from first and second video cameras 126, which, as mentioned above, may operate in the visible or IR portions of the E-M spectrum. The two cameras 126 are advantageously mounted on the vehicle in two separate locations selected for providing a stereoscopic video image. The inputs $I_{d1}$ and $I_{d2}$ are respectively directed to first and second quality verification blocks or steps 701, 702, each of which verifies the quality of its 2-D imagery input to determine if it conforms to the scene and not to obscurants or a failed camera. The output from the quality verification blocks or steps 701, 702, which is data that providing a timely and valid representation of the scene (excluding obscurants), is directed to a 3-D structure-from-stereo block or step 705. The structure-from-stereo block or step 705 uses a conventional structure-from-stereo algorithm to convert the 2-D imagery into a 3-D point cloud.

The 3-D point cloud data in the output from the structure-from-stereo block or step 705 are next classified as terrain or non-terrain (classification block or step 710). The data are also searched, in navigation stabilization block or step 720, to find information indicating objects that may be considered landmarks, with such landmark-indicative information being used to motion-stabilize the sensor data. The navigation stabilization block or step 720, which may advantageously employ conventional Kalman filtering methods to estimate the navigation state, may be operative before, after, or simultaneously with the classification block or step 710. The output of the navigation stabilization block or step 720 is the input to the 3-D stereo process and classify module

230*d* (FIG. 2). After the classification block or step 710, the terrain data are operated on by an interpolation block or step 730, in which gaps in the terrain data (caused by, e.g., obscurants, distortion, errant reflections, etc.) are filled in by an interpolation algorithm (e.g., a bilinear algorithm), as is well-known in the art. The non-terrain data yielded by the classification block or step 710 are advantageously operated on by a second, or non-terrain, classification block or step 740, in which the non-terrain data are further classified as to the type of object (e.g., tree, building, tower, etc.). The outputs from the terrain interpolation block or step 730 and the non-terrain classification block or step 740, are fed to the scene fusion module 232 (FIG. 2).

Figure 8:
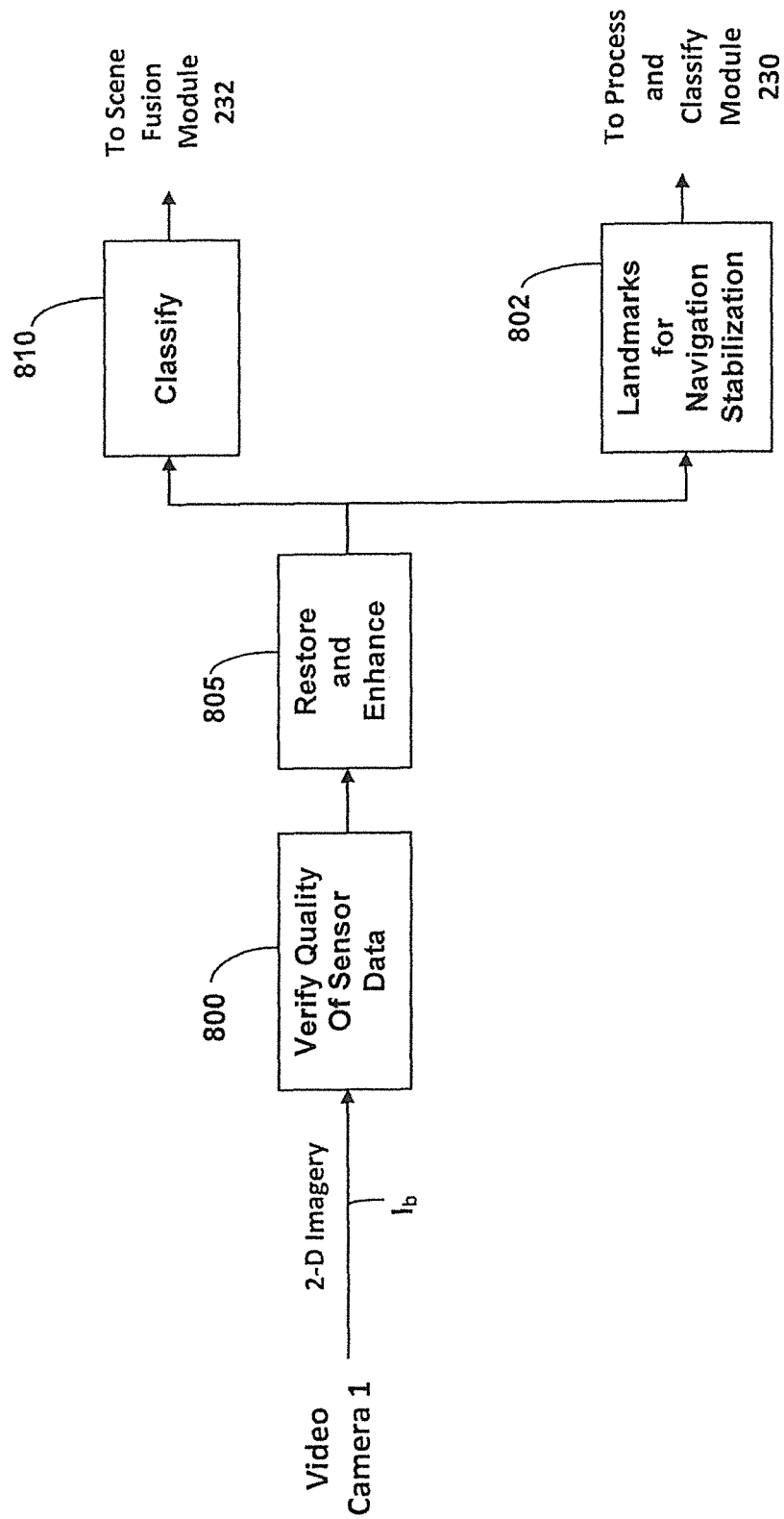
FIG. 8 is a block diagram illustrating a 2-D video process and classify function in accordance with still another aspect of the disclosure.

FIG. 8 is a block diagram showing the operation of an exemplary 2-D video process and clarify module 230*b* (FIG. 2), in accordance with an aspect of the disclosure. The input $I_b$ includes a video stream of 2-D imagery from a video camera 126, which, as mentioned above, may operate in the visible or IR portions of the E-M spectrum. The input $I_b$ is directed to a quality verification block or step 800, which verifies the quality of the 2-D imagery to determine if it conforms to the scene and not to obscurants or a failed camera. The output from the quality verification block or step 800, which is data providing a timely and valid representation of the scene (excluding obscurants), is passed on to a restoration and enhancement block or step 805. The restoration and enhancement block or step 805 mathematically restores and corrects imagery errors, such as shape distortion errors in optical lenses, using, for example, a Wiener filter, as is well-known in the art. The restoration and enhancement block or step 805 also enhances the imagery signal to improve contrast, using known techniques, such as, for example, unsharp masking.

The restored and enhanced video imagery signal may then be directed to a classification block or step 810 and a navigation stabilization block or step 820. The classification block or step 810 is advantageously provided if a 2-D video imagery signal is received as thermal imagery from a Long Wave Infrared (LWIR) sensor. In that case, the classification block or step 810 classifies the thermal imagery obtained by the LWIR sensor into scene content comprising "hot" objects (those displaying higher temperatures in the thermal imagery), and "cold" objects (those displaying lower temperatures in the thermal imagery). The navigation and stabilization block or step 820, in which the video imagery is searched to find information indicating objects that may be considered landmarks, with such landmark-indicative information being used to motion-stabilize the sensor data. The navigation stabilization block or step 820, which may advantageously employ conventional Kalman filtering methods to estimate the navigation state, may be operative before, after, or simultaneously with the classification block or step 810. The output of the navigation stabilization block or step 820 is the input of the 2-D process and classify module 230*b* (FIG. 2). The output from the classification block or step 810 is fed to the scene fusion module 232 (FIG. 2).

The navigation stabilization blocks or steps 520, 620, 720, 820 described above and illustrated in FIGS. 5-8, respectively, may be configured as, or incorporated in, a single functional block or step, or they may be discrete functional blocks or steps, each of which provides a separate input to its associated process and classify module.

As discussed above with reference to FIG. 2, the scene fusion module 232 can be used, in an aspect, to combine the a priori scene data 120 with the sensor data from radar 122, lidar 124, and other sensor(s) 126. This is typically advantageous because, as indicated above, the a priori scene data 120 may be out of date (new buildings may have been erected or knocked down, bridges may have been erected, etc.) or may simply not be able to account for non-stationary objects (such as vehicles, personnel, temporary barricades, debris, etc.). The scene fusion module 232 will generally output the combined scene model 234 in a quad or oct tree data structure format, although other data formats may also be used. The combined scene model 234 data can be supplied to the image rendering module 236 to render a virtual image of the scene. In an aspect, this may be from the vehicle operator's perspective so as to correlate generally with what the operator does or should see outside the vehicle. As previously mentioned, one or more cameras 126 (e.g., stereo multiple view video or monocular view video) may be employed as environmental sensors. In such case, the rendered virtual image from the image rendering module 236 may be combined with data from the camera(s) 126 in the video fusion module 240 for output to the display 128. It will be appreciated that the camera(s) 126 may include those imaging in the visible, near infrared (NIR), and mid-wave infrared (MWIR) portions of the E-M spectrum, and they may also include multi- or hyper-spectral cameras.

In an aspect, the combined scene model 234 optionally may be fed back into the a priori scene data 120 as previous collection data 234', for use in the same location at a future time. In such a case, the data sent to the previous collection data 234' may filter out identified obstacles to reduce or prevent non-stationary objects from being factored into future scene data usage when those non-stationary objects may have been moved. The combined scene model 234 may also be fed back into the scene fusion module 232 for updating.

Providing a preexisting combined scene model 234 into the fusion module 232 may simplify processing, because significant portions of the combined scene model 234 may not change, and processing efficiencies can result. For example, smaller portions of the a priori scene data 120 may be loaded into the system when updating a combined scene model 234, such as only portions at a scene model horizon, only portions of the scene that the vehicle is approaching (such as to increase the resolution—which also may be referred to as "splitting" tiles in a quad or oct tree model—wherein computations are done at a tile level, and splitting tiles creates multiple smaller tiles and thus higher resolution in a given area), combinations or the same, or the like. Similarly, in an aspect, portions of the combined scene model 234 may be dropped or resolution may be lowered (which may be referred to as "pruning" tiles in a quad or oct tree model—wherein, for example, two or more tiles are combined to provide fewer computations over a larger area, which would provide a lower resolution), such as for portions of the scene from which the vehicle is moving farther away. Splitting and pruning tiles may also be accomplished by changing levels within a quad or oct tree data structure.

Figure 9:
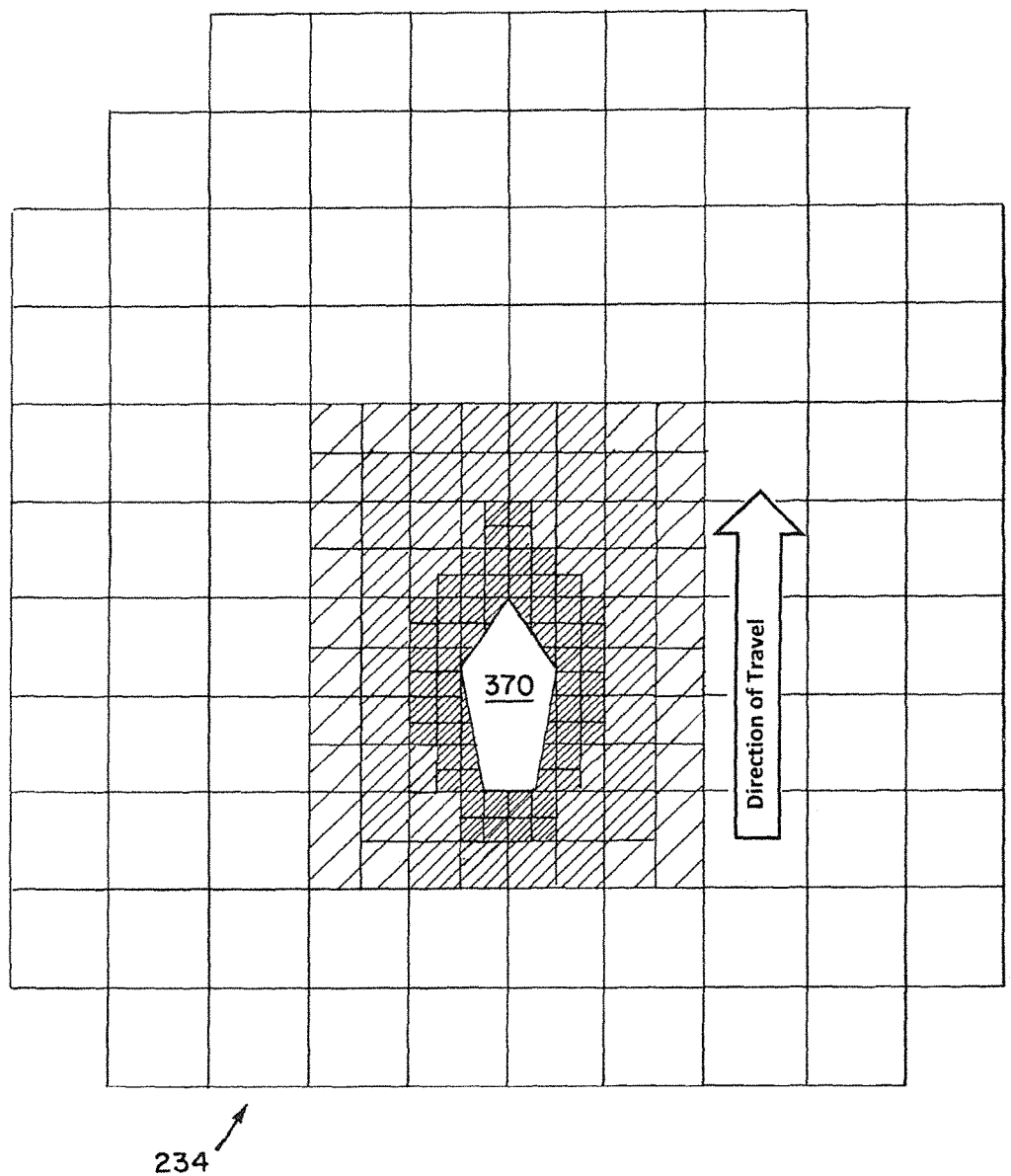
FIG. 9 is a diagram of a multi-resolution scene grid as generated by an aspect of the disclosure.

FIG. 9 illustrates an example of a combined scene model 234 with respect to a vehicle 370 employing a system as described herein. In an aspect, the combined scene model 234 comprises or uses higher resolution data (indicated by smaller tiles in a tighter grid pattern as a result of tile splitting) closer to the vehicle 370, while using lower resolution data as the distance from the vehicle 370 increases (indicated by larger tiles in a larger or looser grid pattern as a result of tile pruning). Furthermore, the instantaneous location, orientation, and direction of the vehicle 370 may be provided by data from the navigation sensors 134, and this information may be reflected in the tile pattern in the vicinity of the vehicle. For example, as shown in FIG. 9, a larger area of relatively small, densely-spaced tiles at one end of the vehicle than at the other end would indicate that the vehicle is traveling toward the larger area of smaller tiles.

Figure 10:
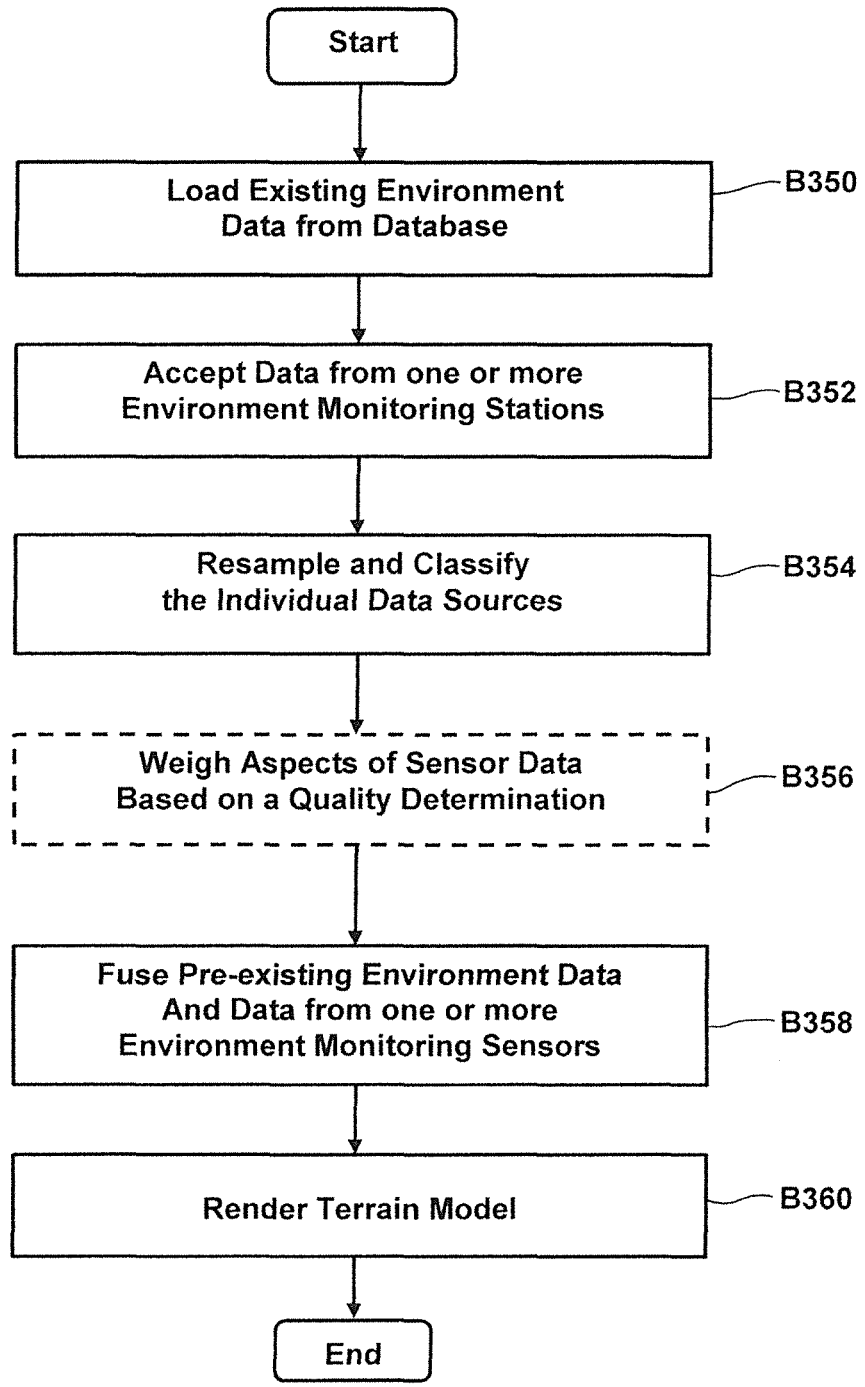
FIG. 10 is a flow chart of a method for combining scene data from multiple sources to generate an image of an environment according to an aspect of the disclosure.

FIG. 10 illustrates a process for combining pre-existing (a priori) scene data and sensor data. Starting at block B350, existing environmental data are loaded from a database, such as one or more of a priori scene data sources 120. At block B352, data are accepted from one or more environment monitoring sensors, such as radar, lidar, camera, sonar, and the like. At block B354, the data sources are processed and classified, for example, to identify important portions of the data sets, and to put them into a common coordinate space. Processing the data sources may provide indications of obstacles that may be highlighted for an operator or otherwise identified for variations in processing. At block B356, optionally, sensor data from multiple sensors may be compared, and portions of each data set may be weighted as more important to factor in combining the data overall. For example, a specific (e.g., higher quality, higher information or higher resolution/precision) sensor may be weighted as more important than other (e.g., lower quality, lower information, lower resolution/precision) sensors, unless specific conditions are identified that may make the selected sensor's data unreliable. Specifically, as noted above, radar data are typically reliable through obscurants, such as dust or clouds; on the other hand, lidar data may have higher spatial resolution but can be blocked by obscurants, and are thus less reliable in determining scene content, in some instances. Operating conditions of the sensors, weather in the surrounding environment, or other factors may give one type of sensor greater weight than another. In an aspect, chunks of data from one sensor will be used where the weighting is higher than a pre-defined threshold. In another aspect, the entirety of one sensor's data may be chosen for processing and combination over the data from another sensor. In still another aspect, specific weighting between two sensors may indicate that the data from both should be combined and used in their entireties or in certain chunks of the data.

In block B358, the process fuses the a priori scene data 120 with data from one or more of the environmental sensors (122, 124, 126) to create/update the combined scene model 234. This fusion, in many aspects, will be performed in the scene fusion module shown in FIG. 2 and described above. In fusing the a priori and sensor data, like scene data points should match as closely as possible among the various data sources. In an aspect, therefore, the data structure from one source may need to be stretched, skewed, or otherwise modified to combine accurately with data from another data source. Identification of terrain versus non-terrain objects can help provide more accurate merging of data sources, as terrain data points can be used to align the data sets, and non-terrain objects may receive priority over seeming inconsistencies with other data sources, for example.

As described above, combining data sources into a combined scene model 234 may include creating or updating a quad or oct tree data structure. Referring again to FIG. 9, in an aspect, the process may split the quad or oct tree data structure's segments closer to and in front of the vehicle 370 to process at a higher level of granularity; whereas segments farther away from and/or behind the vehicle 370 may be merged ("pruned") and processed at a lower level of granularity. Moreover, to assist in processing efficiency, in an aspect, input relating to the operation of the vehicle 370 in which such a process is operating may affect the fusing of data into the combined scene model 234. For example, if the vehicle 370 is traveling forward, the process may prioritize updating the scene model in front of the vehicle 370 at higher levels of granularity than those behind the vehicle. Other factors, such as the vehicle's speed and course, may also affect the creation or update of the combined scene model 234.

Using the updated combined scene model 234, the process continues to render at least some aspects of the scene model for imaging on the display 128 (FIG. 2) for the vehicle operator at block B360. As described above, this will create a virtual or synthetic image of the environment to help guide the vehicle operator in adverse conditions. In an aspect, the image on the display may merge the virtual scene model with camera data, such as IR camera data. Further, in an aspect, the image rendering module 236 (FIG. 2) may use identified object data to render objects on the display in a different color or otherwise highlight them to more easily identify them to the vehicle operator. This scene updating and rendering may preferably be done in at least as close to real time as will allow a vehicle operator to pilot the vehicle 370 accurately based on the rendered image alone, even if the operator can also see aspects of the scene or use other sensors as aids.

The processes described herein are organized as sequences of operations in the flowcharts shown in the drawings. However, it is understood that at least some of the operations associated with these processes potentially can be reordered, conducted simultaneously, supplemented, or substituted for, while still performing the same overall technique.

The technology described above can be implemented by programmable circuitry programmed or configured by software and/or firmware, or it can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the technology described above may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant [PDA)], manufacturing tool, any device with one or more processors, etc.). For example, a machine-accessible medium includes recordable/non-recordable media (e.g., read-only memory [ROM]; random access memory [RAM]; magnetic disk storage media; optical storage media; flash memory devices; etc.), etc. The term "logic," as used herein, can include, for example, special-purpose hardwired circuitry, software and/or firmware in conjunction with programmable circuitry, or a combination thereof.

While the present disclosure is provided with respect to what is currently considered its preferred aspects, it is to be understood that the disclosure is not limited to that which is described above. To the contrary, the disclosure is intended to cover various modifications and equivalent arrangements within the spirit and scope of the appended claims. Alternatives and additional embodiments will be understood to be within the scope of the disclosure. For example, as mentioned briefly, various aspects of this disclosure can also work with other sensors for the same applications or independent sensor suites for numerous different applications, such as, for example, ocean floor mapping with a submarine or submersible towing sonar system and other underwater observing sensors and/or preexisting data sources.

What is claimed is:

1. An imaging system for use in a moving vehicle to provide a synthetic image of an environment in a vicinity of the vehicle in real-time, comprising:
   a first data source providing scene data including a priori terrain data and a priori obstacle data;
   a second data source providing a 3-D data cloud derived from real-time terrain data and real-time obstacle data;
   a third data source providing real-time video image data including terrain image data and obstacle image data;
   a scene fusion module configured to receive and combine the a priori terrain data and the a priori obstacle data, the 3-D data cloud, and the real-time video image data to produce a real-time, multi-resolution 3-D scene model including the a priori terrain data and the a priori obstacle data updated in real time by the 3-D data cloud and the video image data;
   an image rendering module configured to receive and process the real-time, multi-resolution 3-D scene model to produce an image signal representing the real-time, multi-resolution 3-D scene model; and
   a visual display configured to display a virtual view of the environment in the vicinity of the vehicle in response to the image signal.

2. The system of claim 1, wherein:
   the first data source includes a database containing the a priori terrain data and the a priori obstacle data and a first process and classify module configured to yield the scene data as a multi-resolution 3-D a priori terrain and obstacle data structure;
   the second data source includes a real-time 3-D environmental sensor and a second process and classify module configured to yield the 3-D data cloud as a real-time 3-D scene data structure;
   the third data source includes a camera and a third process and classify module configured to yield the video image data as a real-time video image data structure; and
   wherein the scene fusion module is configured to receive and combine the 3-D a priori terrain and obstacle data structure, the real-time 3-D scene data structure, and the real-time video image data structure.

3. The system of claim 2, wherein the a priori terrain and obstacle data structure includes 2-D and 3-D a priori terrain and obstacle data structures, and the video image data structure includes at least one of a 2-D video image data structure and a 3-D image data structure.

4. The system of claim 2, wherein at least one of the a priori terrain and obstacle data structure, the real-time 3-D scene data structure, and the video image data structure includes navigation data.

5. The system of claim 2, wherein the real-time 3-D environmental sensor is selected from the group consisting of one or more of a radar sensor and a lidar sensor.

6. The system of claim 2, wherein the second data source includes first and second real-time 3-D environmental sensors, each providing real time sensor data as a 3-D data cloud, wherein the second process and classify module is configured to yield the 3-D data cloud from the first and second sensors as first and second real-time 3-D scene data structures, respectively.

7. The system of claim 6, wherein the scene fusion module is configured to replace at least one aspect of the first real-time 3-D scene data structure sensor with a corresponding aspect of the second real-time 3-D scene data structure.

8. The system of claim 7, wherein the scene fusion module is configured to compare a quality of the first real-time 3-D scene data structure to a corresponding quality of the second real-time 3-D scene data structure.

9. The system of claim 1, wherein the scene data provided by the first data source is configured to be updatable by the combined scene model.

10. The system of claim 1, wherein the scene fusion module is configured to (a) receive a first scene data point set from one of the first, second, and third data sources, (b) receive a second scene data point set from another of the first, second, and third data sources, (c) validate the data points of the second scene data point set against the data points of the first scene data point set to create an updated scene data point set, and (d) produce the real-time, multi-resolution scene model from the updated scene data point set.

11. The system of claim 10, wherein the first scene data point set is a set of data points, each of which has been determined to have met a predetermined validity criterion, and wherein the scene fusion module is configured to validate the data points of the second scene data point set by determining whether each of the data points of the second scene data point set meets the predetermined validity criterion.

12. The system of claim 11, wherein the scene fusion module is further configured to use only those data points of the second scene data point set that have been determined to have met the predetermined validity criterion to create the real-time scene data point set.

* * * * *